United States Patent
Thomzick et al.

(10) Patent No.: US 11,339,814 B2
(45) Date of Patent: May 24, 2022

(54) PROFILE ASSEMBLY

(71) Applicant: Otto Fuchs Kommanditgesellschaft, Meinerzhagen (DE)

(72) Inventors: Gerd Thomzick, Marienheide (DE); Christoph Schulte, Meinerzhagen (DE); Hendrik Schliffke, Kierspe (DE); Christian Adleff, Gummersbach (DE)

(73) Assignee: OTTO FUCHS KOMMANDITGESELLSCHAFT, Meinzerhagen (DE)

( * ) Notice: Subject to any disclaimer, the term of this patent is extended or adjusted under 35 U.S.C. 154(b) by 0 days.

(21) Appl. No.: 16/963,959

(22) PCT Filed: Feb. 8, 2018

(86) PCT No.: PCT/EP2018/053177
§ 371 (c)(1),
(2) Date: Jul. 22, 2020

(87) PCT Pub. No.: WO2019/154500
PCT Pub. Date: Aug. 15, 2019

(65) Prior Publication Data
US 2021/0054860 A1  Feb. 25, 2021

(51) Int. Cl.
*F16B 5/00* (2006.01)
*F16B 11/00* (2006.01)
*F16B 17/00* (2006.01)

(52) U.S. Cl.
CPC .......... *F16B 5/0012* (2013.01); *F16B 5/0096* (2013.01); *F16B 11/004* (2013.01); *F16B 17/008* (2013.01)

(58) Field of Classification Search
CPC .. E04B 2001/243; F16B 5/0012; F16B 5/002; F16B 5/0096; F16B 5/07; F16B 11/002;
(Continued)

(56) References Cited

U.S. PATENT DOCUMENTS 3,055,461 A * 9/1962 De Ridder ............ F16B 5/0096
52/588.1
3,477,350 A * 11/1969 Glaza .................... F16B 5/0096
404/41

FOREIGN PATENT DOCUMENTS

DE  7112240 U  3/1971
DE  3248072 A1 * 1/1984 ............ F16B 5/0096
(Continued)

OTHER PUBLICATIONS

International Search Report dated Aug. 15, 2019 in parent PCT application PCT/EP2018/053177.
(Continued)

*Primary Examiner* — Josh Skroupa
(74) *Attorney, Agent, or Firm* — Polson Intellectual Property Law, PC; Margaret Polson; Christopher Sylvain

(57) ABSTRACT

A profile assembly having a first profile and having a second profile connected on its long side to the first profile, which two profiles each have a hook strip integrally formed on the long side, wherein the hook projection of the hook strip of the first profile points in the one direction, and the hook projection of the hook strip of the second profile points in the opposite direction, the hook strips brought into engagement with one another in a claw-like manner. The first profile has an anchoring channel following its longitudinal extent, and the hook strip of the second profile has a clamping strip which is integrally formed thereon, which hook strip is secured by its hook projection and its clamping strip in the anchoring channel of the other profile by a cold joining connection. In order to produce the cold joining connection, one of the two hook strips comprises an adjusting strip which is formed by the cold joining process and which is supported in the produced profile assembly by its free end face while being under prestress. The hook strip secured in the anchoring channel is placed under prestress within the
(Continued)

anchoring channel, at two points situated opposite one another in the direction of the height of the profile assembly, with respect to the adjoining portions of the first profile as a result of the cold joining connection.

12 Claims, 4 Drawing Sheets

(58) Field of Classification Search
CPC .... F16B 11/004; F16B 17/008; Y10T 403/49; Y10T 403/4916; Y10T 403/4949; Y10T 403/4991; Y10T 403/70; Y10T 403/7043; Y10T 403/7073
USPC ........ 403/274, 276, 280, 285, 345, 363, 375
See application file for complete search history.

(56) References Cited

FOREIGN PATENT DOCUMENTS

| | | | | |
|---|---|---|---|---|
| DE | 3423967 A1 | 1/1986 | | |
| DE | 3806091 A1 | 9/1989 | | |
| DE | 9411672 U1 | 4/1995 | | |
| DE | 29508974 U1 * | 8/1995 | ............ | F16B 17/008 |
| DE | 19633431 C1 * | 1/1998 | ............ | F16B 5/0096 |
| DE | 202005008016 U1 | 8/2005 | | |
| DE | 202016104744 U1 | 9/2016 | | |
| DE | 202016104740 U1 | 11/2016 | | |
| EP | 0508083 A1 | 10/1992 | | |
| FR | 2746481 A1 * | 9/1997 | ............ | F16B 5/0096 |
| WO | WO-0009384 A1 * | 2/2000 | ................ | F16B 5/08 |

OTHER PUBLICATIONS

Written Opinion of the International Searching Authority dated Aug. 15, 2019 in parent PCT application PCT/EP2018/053177.
International Preliminary Report on Patentability, Ch. II, dated Apr. 22, 2020 in parent PCT application PCT/EP2018/053177.
Pending U.S. Appl. No. 16/817,486, filed Mar. 12, 2020. Per rule 609.07, copy not provided as this is available in the USPTO system.
Examination Report dated Aug. 13, 2021 in related Chinese application 201880088734.6.
Examination Report dated Mar. 17, 2022 in related Chinese application 201880088734.6.

* cited by examiner

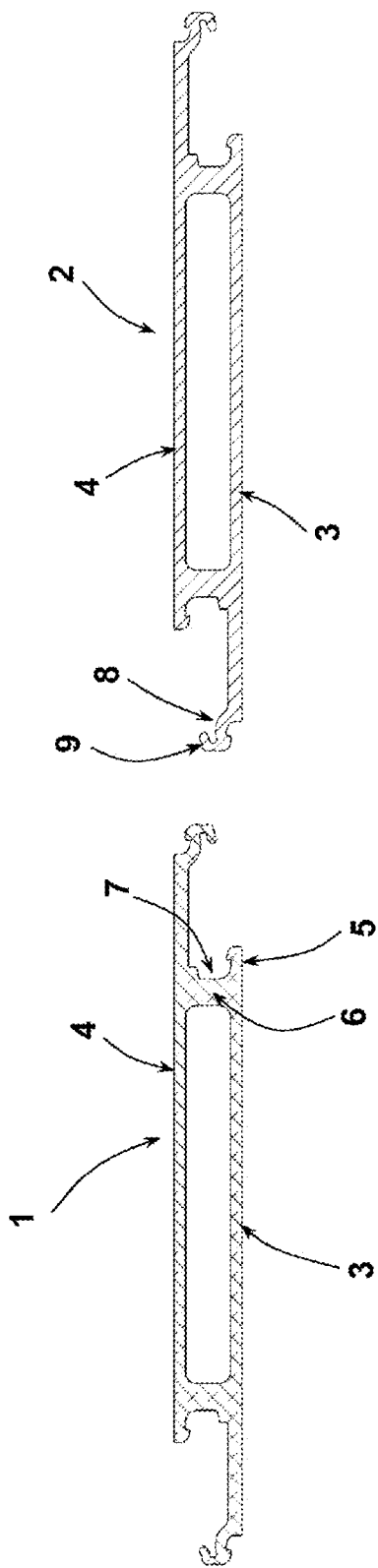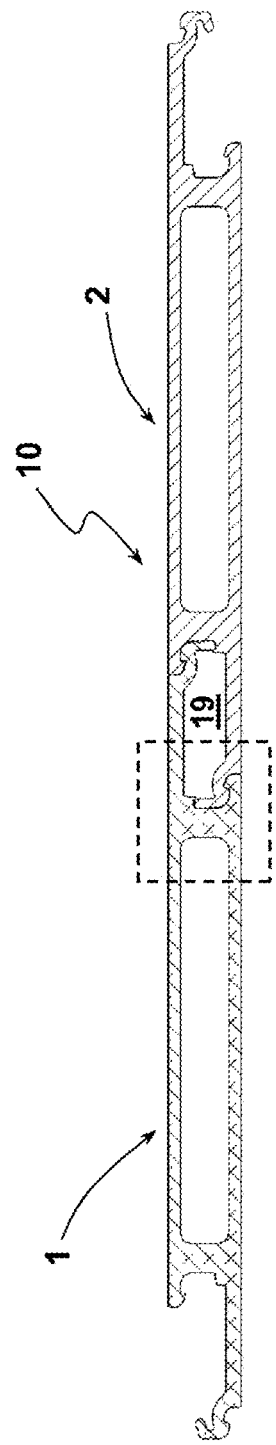

US 11,339,814 B2

PROFILE ASSEMBLY

BACKGROUND

The present disclosure relates to a profile assembly having a first profile and having a second profile connected on its long side to the first profile, which two profiles each have a hook strip integrally formed on the long side, wherein the hook projection of the hook strip of the first profile points in the one direction and the hook projection of the hook strip of the second profile points in the opposite direction and the hook strips are brought into engagement with one another in a claw-like manner, wherein the first profile has an anchoring channel following its longitudinal extension and the hook strip of the second profile has a clamping strip integrally formed thereon, which hook strip is secured by its hook projection and its clamping strip in the anchoring channel of the other profile by means of a cold joining connection, wherein, in order to produce the cold joining connection, one of the two hook strips comprises an adjusting strip which is formed by the cold joining process and which is supported in the produced profile assembly by its free end while being under prestress.

Such a profile assembly is known from DE 20 2005 008 016 U1. In this previously known profile assembly, two profiles are positively connected to one another on their long side in the plane of the profile assembly along the longitudinal extension of the profile. To this end, a hook strip is molded onto the long side of each such profile. The hook formations, as caused by the hook projections, of the two hook strips which are in engagement with one another point into opposite directions, such that the two hook strips can be brought into engagement with one another in a claw-like manner by means of their hook projections and are in engagement with one another in this manner in the produced profile assembly. In this manner, the two profiles are positively connected in a transverse direction to their longitudinal extension. The hook projection of the hook strip of the first profile is provided by an anchoring channel into which the hook projection of the hook strip of the second profile is bent, engaging in the undercut provided by the anchoring channel.

In this previously known profile assembly, an adjusting strip is molded to the hook strip of the second profile. The adjusting strip is molded to the rear side of the hook strip with respect to the hook projection. Before the profile assembly is produced, it is in such a position that applying a force transversely to the height of the profiles allows pressing the profiles together with the hook projection into the undercut of the anchoring channel of the first profile. The adjusting strip itself is supported on a side wall of the anchoring channel opposite the hook projection in the produced profile assembly to secure the adjusting strip at this point following its longitudinal extension. In this prior art, the adjusting strip is at the same time the clamping strip of the profile assembly.

In this previously known profile assembly, the hook projection of the hook strip, to which the adjusting strip is molded, engages in the undercut of the anchoring channel of the first profile. The hook projection in the anchoring channel is not supported thereon. The abutment for supporting the adjusting strip on the side wall of the anchoring channel is located on the outer side of the hook projection of the first profile. A gap remains between the outer surface of the adjusting strip and the bottom of the anchoring channel. This gap can be used to insert a filling compound if the profile assembly is to be waterproof or have a damping effect.

Even though such a profile assembly has proved its worth for years, it would be desirable to improve it in that the profile assembly is not just water and gas tight without having to insert an additional sealant into the profile assembly, but that it also shows improved transverse strength.

It is therefore an aspect of the present disclosure to provide such a profile assembly.

SUMMARY

This is provided by a generic profile assembly of the type mentioned at the outset, in which the hook strip secured in the anchoring channel is prestressed against the adjacent sections of the first profile in the anchoring channel at two opposite points in the height direction of the profile assembly due to the cold joining connection.

In this profile assembly, the hook strip section with the hook projection and the clamping strip pressed into the anchoring channel of the first profile is supported on two walls of the first profile which are facing one another. This two-point support under prestress within the anchoring channel allows applying a particularly high prestressing force between the two profile parts which are in engagement with one another. Even though the support of the parts of the hook strip of the other profile inserted in the anchoring channel with a two-point support is mentioned herein, it will be appreciated that the support on the walls of the first profile facing one another is two-dimensional, even though the width is partially quite small when viewed in the transverse direction to the longitudinal profile extension. This high prestressing force results in forming a metallic seal, so that such a profile assembly can be made gastight and/or watertight without needing additional sealants or sealing materials. It is advantageous with this profile assembly that the hook projection of the first profile, which provides the anchoring channel, engages in the hook receptacle provided by the hook strip of the second profile but is not supported in the hook receptacle, at least not under any noteworthy prestress. As a result, a zone is created which acts transversely to the longitudinal extension of the profiles and in which tensile or pressure loads acting in this direction onto the profile assembly can be elastically absorbed as long as these do not exceed a specific magnitude. In the case of a tensile load, this zone can react by a certain degree of stretching without impairing the profile assembly and without the risk of cracking. In this respect, viewed transversely, the hook of the second profile is rigidly fixed, together with the clamping strip molded to its rear side, in this profile assembly, while the engagement of the hook projection of the hook strip of the first profile in the hook receptacle of the second profile allows a certain flexibility of stretching, particularly in the elastic range. In this respect, the claw-like engagement of hook strips is used in this profile assembly for forming such a potential compensation zone for improving transverse strength. Loads of the type mentioned above can occur, for example, when the profile assembly is dynamically stressed.

According to a first embodiment of the profile assembly, the adjusting strip is molded on the rear side with respect to the hook projection to the hook strip of the second profile and forms the clamping strip in the profile assembly produced, and the distance of the side walls of the anchoring channel against which the hook strip engaging therein is prestressed is smaller than the distance of the free end face of the adjusting strip before it is formed across the outer side of the hook strip to the point in the hook projection situated opposite the free end face of the adjusting strip.

The high supporting or prestressing forces can be provided in this embodiment without having to make the hook strip of the first profile, which carries the anchoring channel, thicker compared to the material thickness of conventional profiles with hook strips of the type discussed here. This profile assembly cleverly utilizes the fact that the abutment for supporting the adjusting strip acts with particularly small leverage onto the hook strip of the first profile which provides the anchoring channel, typically in the range of the root where said hook strip is molded to a flange of said profile. Due to pressing the hook projection with the adjusting strip molded to the rear side of its hook strip into the anchoring channel by means of the cold joining process, the joining force applied transversely to the height of the profile assembly is translated into a prestressing or holding force in the height direction of the profile assembly. The prestressing with which the two supporting surfaces of the hook strip of the second profile, which oppose one another with respect to the side walls of the anchoring channel, act against the side walls of the anchoring channel is maintained due to the relaxation strive following the joining process, which strive the two-point support prevents. The hook projection of the hook strip inserted in the anchoring channel engages behind the hook projection of the hook strip of the first profile, bringing both hook strips with respect to their hook projections into claw-like engagement with one another. Securing the hook strip inserted in the anchoring channel at its hook projection and adjusting strip, both supporting surfaces resting under prestress against the respective side wall of the anchoring channel, at the same time secures the adjusting strip. In such an embodiment, the secured adjusting strip is at the same time the clamping strip.

In a further embodiment, the outer side of the adjusting strip of the second profile acts against the bottom of the anchoring channel when it is inserted into the anchoring channel of the first profile by means of the cold joining process. The pressure applied by the cold joining tool onto the rear side of the adjusting strip is then introduced via the bottom of the anchoring channel into the material surrounding the anchoring channel of the second profile, which causes the hook strip of this profile to strive to be pressed into the hook strip carrying the adjusting strip. This moment of force counteracts the moment of widening with respect to the width of the anchoring channel, which is caused by pressing the hook strip and its hook projection and its adjusting or clamping strip into the anchoring channel. In such an embodiment, the prestressing that acts onto the supporting surfaces of the hook projection and the adjusting strip of the second profile can be dimensioned even greater without having to fear that the hook strip of the first profile is bent apart. The additional input of force into the bottom of the anchoring channel prestresses the hook projections brought into engagement with one another, thereby providing a particularly robust clearance-free profile assembly. This effectively prevents noises which may occur in conventional profile assemblies.

The hook projection to be inserted into the undercut of the anchoring channel preferably has a supporting surface formed by a convex curvature with a vertex. This measure concentrates the forces for its narrower-in-width contact surface with the side wall of the anchoring channel. The side wall forming the abutment is either of a straight design or curved in the same direction as the curvature of the hook projection rested or to be rested against it under prestress, though with a greater radius.

In one embodiment, the side wall of the anchoring channel supporting the adjusting strip is inclined towards the bottom of the anchoring channel. This makes it easier to press the adjusting strip into the anchoring channel. In addition, the inclination can be adapted such that the force needed to press the adjusting strip into the anchoring channel increases with increasing depth.

According to another embodiment, the adjusting strip is molded to the first profile next to the wall of the anchoring channel opposite its hook strip and carries a prestressing bulge following its longitudinal extension and pointing towards the anchoring channel and having a tensioning projection in the section opposite the prestressing bulge on the bottom of the anchoring channel, and that the hook strip of the second profile carries the clamping strip on its rear side with respect to the hook projection, onto which hook strip the prestressing bulge of the adjusting strip and the tensioning projection of the bottom of the anchoring channel act under prestress in the produced profile assembly, while the free end face of the adjusting strip is supported under prestress on the outer side of the hook strip of the second profile in the produced profile assembly.

In this embodiment, the two-point support is provided under prestress within the anchoring channel of the first profile by the adjusting strip through applying the prestressing force which acts in the height direction of the profile assembly, wherein in this embodiment the hook strip of the first profile, in addition to its hook projection, has a clamping strip molded to its rear side. It is clamped under prestress between the anchoring channel side of the adjusting strip and the bottom of the anchoring channel. The required prestress is achieved by providing a prestressing bulge on sides of the adjusting strip and a tensioning projection on the side of the bottom of the anchoring channel situated opposite the prestressing bulge. The geometry of the prestressing bulge and the tensioning projection forms the two-point support and defines it within the anchoring channel. In this embodiment, the free end face of the adjusting strip rests against the outer side of the hook strip of the second profile in the profile assembly, being likewise under prestress. The abutment for applying this prestress is provided by the hook projection of the first profile which carries the anchoring channel, which projection is situated opposite the free end face of the adjusting strip with respect to the hook strip of the second profile. In this manner, a support arrangement which meets the requirements of a metallic seal is created under prestress at a second point outside the anchoring channel in this embodiment of the profile assembly. In this embodiment as well, the hook strips which are in claw-like engagement with one another are rigidly connected only with respect to the section of the hook strip of the second profile that engages in the anchoring channel, such that the length compensating zone described for the first embodiment is present in transverse direction to the longitudinal extension of the profile.

In order to translate as much force as possible into the desired prestressing force by means of cold joining, the hook strip carrying the adjusting strip may have a tapering where it is connected to the profile in both embodiments described. Said tapering is provided in one example embodiment as a groove cut into the connecting section of the adjusting strip. The position of the tapering defines the pivot point of the adjusting strip. At the same time, less forming force has to be input into forming work of the adjusting strip.

The process of cold joining in which the adjusting strip is formed by means of a mandrel or roller can be performed such that, next to the free end face of the adjusting strip, material of the other profile is formed into a locking bulge supported on the rear side of the adjusting strip. This provides additional positive locking of the adjusting strip.

The profiles of such a profile assembly typically are extruded profiles made of a light metal alloy, e.g. an aluminum alloy. Such a profile assembly can be provided from a plurality of individual profiles connected to one another in the manner described above. A profile assembly can be formed with profiles having just one flange as well as with profiles designed as hollow chamber profiles and comprising an upper flange and a lower flange. In the latter case, hook strips of the type described above may be molded to the upper flange as well as to the lower flange. Combinations of the profiles described above are likewise possible, of course.

Due to the gastight and watertight profile assembly, components can be produced from profiles of this type which must meet respective requirements, e.g. battery housings as used in electric vehicles for receiving the necessary battery modules.

BRIEF DESCRIPTION OF THE DRAWINGS

The following description uses example embodiments with reference to the appended figures, wherein:

FIG. 1 shows a first profile and a second profile according to a first embodiment for forming a profile assembly, FIG. 2 shows the profile assembly produced from the profiles shown in FIG. 1.

DETAILED DESCRIPTION

Figure 3:
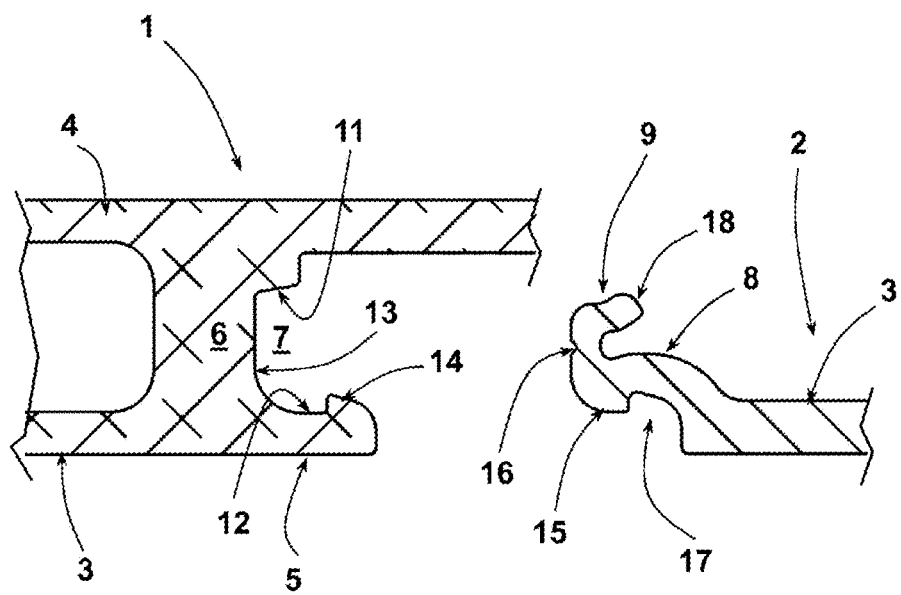
FIG. 3 shows an enlarged view of the connecting elements of the two profiles before forming the profile assembly in the section marked by a dashed line in FIG. 2.

FIG. 1 shows a first profile 1 and a second profile 2. Both profiles 1, 2 are identical in the example embodiment shown. The profiles 1, 2 are extruded hollow chamber profiles made of an aluminum alloy. The profiles 1, 2 each have a lower flange 3 and an upper flange 4. Complementary connecting elements are located on the ends of the long sides of the flanges 3, 4, pointing towards one another. Since this example embodiment includes profiles 1, 2 having a lower flange 3 and an upper flange 4, there are two connecting elements on each long side which are brought into engagement with the complementary connecting elements of the other profile for producing a profile assembly and are permanently joined by means of a cold joining process. The first profile 1 has a hook strip on the longitudinal side edges of its lower flange 3 which point to the second profile 2. An anchoring channel 7 is cut into the outer side into a web 6 connecting the lower flange 3 to the upper flange 4. As a complementary connecting means, the second profile 2 also has a hook strip 8 on the longitudinal end pointing to the first profile 1, but with its hook projection pointing in the opposite direction of the hook projection of the hook strip 5. This layout of the hook strips 5, 8 serves the purpose of bringing them into claw-like engagement in the profile assembly (see FIG. 2). An adjusting strip 9 is molded to the rear side of the hook strip 8. The interaction of these connecting elements is described below.

The same connecting elements, which are at an offset to one another in the transverse direction of the two profiles 1, 2, are disposed in a reversed configuration on the upper flange 4 of the two profiles 1, 2.

FIG. 2 shows the two profiles 1, 2 joined into a profile assembly 10. FIGS. 1 and 2 show an example of a profile assembly 10 using two profiles 1, 2. It will be appreciated that a plurality of such profiles can be interconnected in the same manner into a profile assembly. In the example embodiment shown, hollow chamber profiles are shown as profiles 1, 2. As results from the explanations below, the connecting technology described below can also be used for joining profiles having just one flange.

The configuration of the connecting elements of the two profiles 1, 2 of the lower flanges 3 when not yet brought into engagement can be seen in the enlarged view of FIG. 3. The anchoring channel 7 of the first profile 1 is surrounded by a first side wall 11 and a second side wall 12, which two side walls 11, 12 are connected to one another by a bottom 13. The side wall 12 of the anchoring channel 7 is undercut in transverse direction to the longitudinal extension of the profile 1 by the hook projection 14 of the hook strip 5. The side wall 11 is inclined towards the bottom 13 of the anchoring channel 7 and is used as an adjusting surface for creating the profile assembly.

A hook projection 15 is molded to the hook strip 8 of the second profile 2, pointing towards the outer side of the lower flange 3. The adjusting strip 9 is molded to the rear side of the hook strip 8 with respect to the hook projection 15. In the region where the adjusting strip 9 is connected to the hook strip 8, a groove 16 following the longitudinal extension of the hook strip 8 is cut into the outer side pointing towards the first profile 1. A tapering is formed by the groove 16 in the connecting region of the adjusting strip 9 to the hook strip 8. The hook projection 15 provides a hook receptacle 17 in the direction towards the lower flange 3, into which receptacle the hook projection 14 of the first profile 1 engages to form the profile assembly 10.

Figure 4:
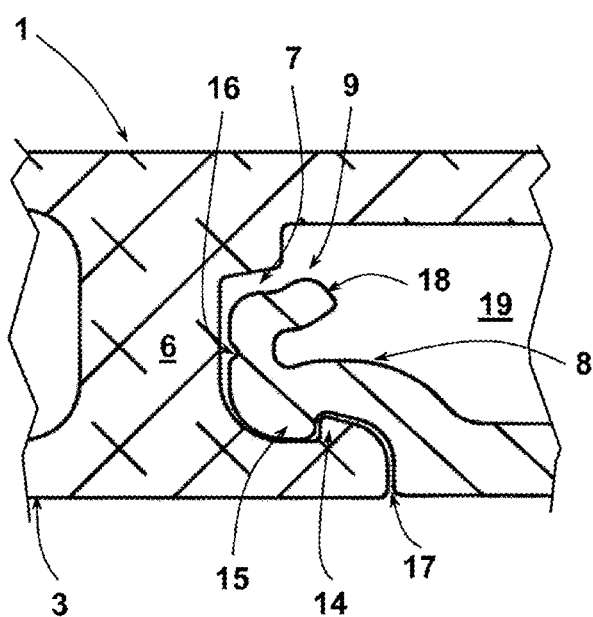
FIG. 4 shows the profiles brought into engagement with one another in the section marked by a dashed line in FIG. 2 before creating a cold joining connection.

In order to form the profile assembly 10, the hook projections 14, 15 of the hook strips 5, 8 are in a first step brought into engagement with one another. The hook projection of the second profile 2 is inserted in the undercut portion of the anchoring channel 7, and the hook projection 14 is inserted in the hook receptacle 17 of the hook strip 8. This position is shown in FIG. 4. The free end face 18 of the adjusting strip 9 is pointing away from the anchoring channel 7 of the first profile 1 in this pre-joining position.

In the same way as described in FIG. 4 for the connecting elements molded to the lower flanges 3, the connecting elements of the upper flanges 4 of the two profiles 1, 2 are brought into engagement. In this position, the free end faces 18 of the adjusting strips 9 point towards one another. A cold joining step is performed in order to produce the profile assembly, so that the two profiles 1, 2 are permanently connected to one another by a cold joining connection. To this end, a forming tool is drawn through the chamber 19 closed by plugging the two profiles 1, 2 together in the direction of the longitudinal extension of the two profiles 1, 2. Each adjusting strip 9 is pressed into the anchoring channel 7 of the respective other profile by this cold forming step. Pressing in is supported by the inclined side wall 11 of the anchoring channel 7.

Figure 5:
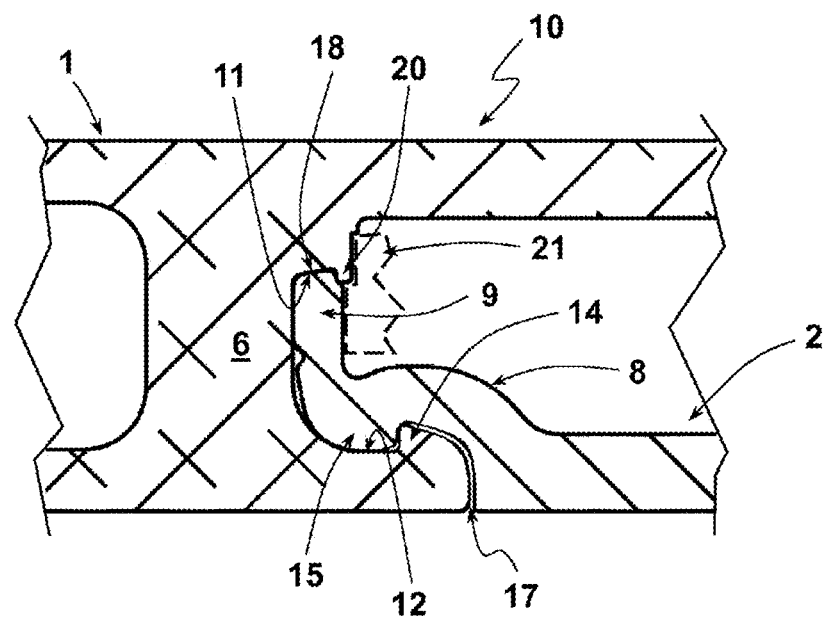
FIG. 5 shows an enlarged view of the profile assembly of FIG. 2 in the marked section.

FIG. 5 shows the profile assembly 10 produced using a mandrel or two opposing rollers as a forming tool. In this forming process, the adjusting strip 9 is entirely pressed into the anchoring channel 7. Thus the adjusting strip 9 at the same time forms the clamping strip in this example embodiment, since it is secured under prestress in the anchoring channel 7 of the first profile 1 in the profile assembly 10. The free end face 18 of the adjusting strip 9 rests against the side wall 11 in the profile assembly 10 (see FIG. 5). As a result of the forming process, the section of the head of the hook projection 15 situated opposite the formed free end face 18 is pressed against the side wall 12 of the anchoring channel 7, which is situated opposite the side wall 11. Since the distance from the free end face 18 to the point at which the head of the hook projection 15 abuts the side wall 12 is greater in the non-formed state of the adjusting strip 9 than after forming, the hook strip 8 is secured in the anchoring channel 7 under prestress at its free end face 18 of its adjusting strip 9 and the head of the hook projection 15 in a two-point support, wherein the two supporting surfaces—the free end face 18 of the adjusting strip 9 (on the one hand) and the outer side of the hook projection 15 (on the other)—are opposite in the direction of the height of the profile assembly (10) with respect to the direction of action of the prestress. Due to forming the adjusting strip 9, the force input has been shifted into a direction transverse to the direction of the force applied, Relaxation is effectively prevented due to the side walls 11, 12 of the anchoring channel, such that the prestress is maintained. The groove 16 defines the pivot point of the adjusting strip 9. The force applied is introduced into the first profile 1 via the free end face 18 of the adjusting strip 9 and the opposite outer side of the hook projection 15. Due to the forming process, the claw surfaces of the hook projections 14, 15 are moved towards one another until they abut, such that the transverse extension of the profile assembly 10 is clearance-free.

In the example embodiment shown, a metallic seal is formed respectively on the free end face 18 of the adjusting strip 9 and on the opposite outer side of the hook projection by means of the side walls 11, 12 of the anchoring channel 7. This connection is gastight.

For additionally securing the adjusting strip 9, the forming process in this example embodiment has been performed by means of the forming tool used such that a locking bulge 20 was formed from the material of the first profile 1, which locking bulge engages behind the rear side of the adjusting strip 9 next to its formed free end face. This additionally secures the adjusting strip 9 pressed into the anchoring channel 7 in a positive fit.

FIG. 5 schematically outlines the contour of a forming tool 21, the forming surface of which is offset to form the locking bulge 20.

In the example embodiment shown, the outer side of the hook projection 15 which comes into contact with the side wall 12 has a convex shape. The benefit is that the prestressing force is concentrated on the section of the bulge which rests against the side wall 12, which in the example embodiment shown has a greater radius of curvature. In this manner, the prestressing force and the formation of the desired metallic seal are further improved.

The specialty of the profile assembly 10 is that there is no non-positive connection between the outer side of the hook projection 14 and the hook receptacle 17. Instead, a small gap can remain at this point. In the case of a transverse load, this curved gap and the curvature of the hook strip 8, which curvature provides the hook receptacle 17, are used as a length compensation zone where tensile forces applied in transverse direction to the longitudinal extension of the profile assembly 10, particularly tensile forces up to a certain magnitude, can be absorbed elastically. If shear forces should also be absorbed elastically, the gap described above will be formed with a specific gap width. It is worth mentioning that such a length compensation is performed without impairing the cold joining connection between the two profiles 1, 2.

Figure 6:
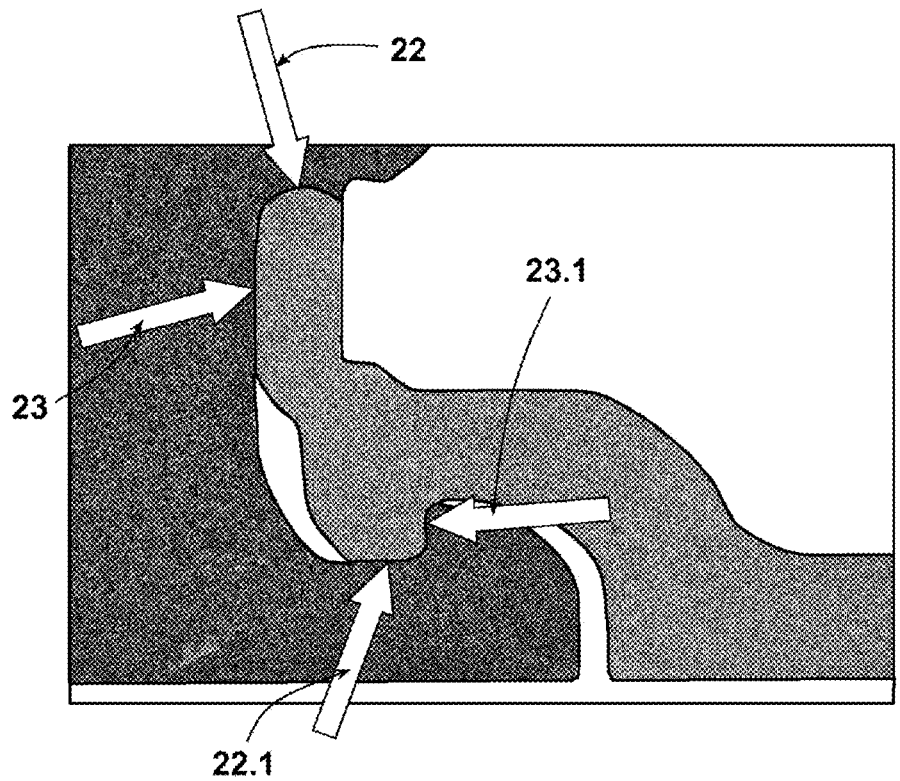
FIG. 6 shows a cross section through a profile assembly corresponding to that of FIG. 5, but as a photograph of a specimen, the profiles of which are extruded aluminum profiles.

While the produced profile assembly 10 has been schematically described in the Figures described above, FIG. 6 shows a photograph of a cross section through two profiles whose geometry matches the geometry of the profiles 1, 2. The opposing supporting points which act under prestress in the height direction of the profile assembly, are marked with block arrows 22, 22.1.

In this specimen, the outer side of the adjusting strip 9 is pressed against the bottom 13 of the anchoring channel 7—the same applies to the example embodiment described in FIGS. 1 to 5. This induces a moment counteracting a widening movement of the anchoring channel 7. The profile assembly 10 can therefore be configured with particularly high prestressing forces. The respective supporting points are marked in FIG. 6 with the reference numerals 23, 23.1, wherein the hook projections 14, 15, which are in claw-like engagement, serve as abutments for introducing force into the bottom 13 of the anchoring channel 7. Also clearly visible is the gap between the outer side of the hook projection 14 disposed next to the supporting surface marked by block arrow 22.1 and the complementary hook receptacle of the second profile. The prestress acting onto the bottom of the anchoring channel 7 is permanently maintained by securing the free end face of the adjusting strip in the anchoring channel.

Figure 7:
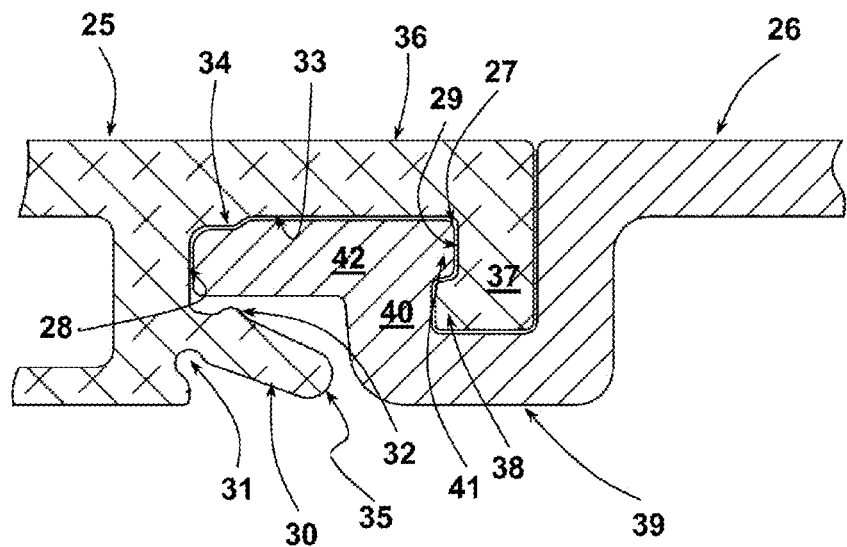
FIG. 7 shows a section of a profile assembly to be created from two other profiles in which the profiles are shown with their connecting elements already in engagement with one another.
Figure 8:
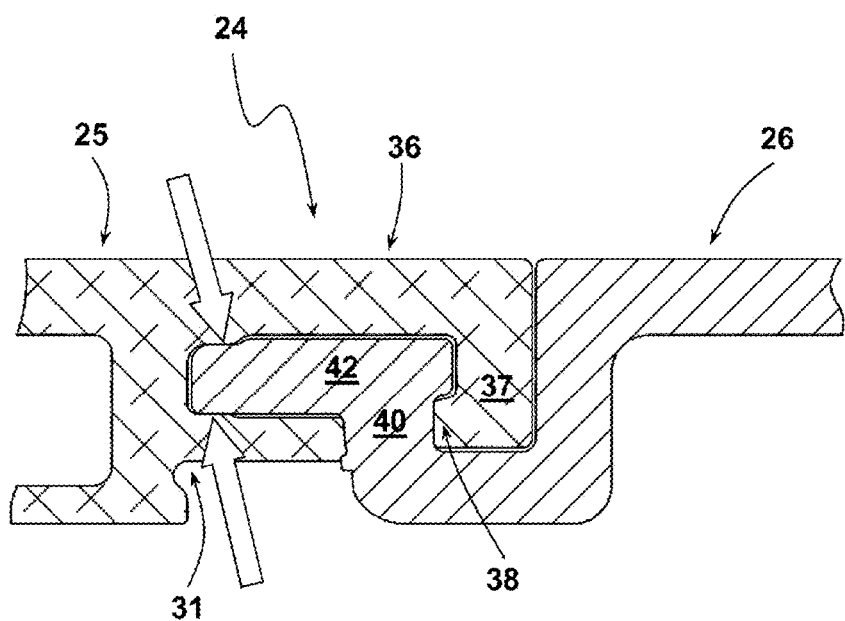
FIG. 8 shows the profile assembly created from the arrangement of profiles of FIG. 7 after creating the cold joining connection.

FIGS. 7 and 8 show another profile assembly 24, also produced from two profiles 25, 26 which are permanently connected to one another by means of a cold joining connection. In this example embodiment, the profile 25 is the first profile and the profile 26 is the second profile. The profiles 25, 26 are extruded hollow chamber profiles made of an aluminum alloy. The profiles 1, 2 differ from the example embodiment described above with respect to the configuration of their connecting elements which are brought into engagement with one another. The first profile 25 has an anchoring channel 27 which follows its longitudinal extension. Its side surfaces 28, 29, unlike the design of the first profile 1 of the figures described above, are not disposed opposite one another with respect to the height of the first profile 25, but in transverse direction to the longitudinal extension of the profile. An adjusting strip 30 is molded to the side wall 28 projecting downward therefrom. A tapering introduced by a groove 31 on the outer side defines the pivoting axis of the adjusting strip 30 shown in FIG. 7 before the forming process. The adjusting strip 30 has a prestressing bulge 32 on its side facing the anchoring channel 27. The bottom 33 of the anchoring channel 27 comprises a tensioning projection 34 in the section opposite the prestressing bulge 32 of the adjusting strip 30. The prestressing bulge 32 and the tensioning projection 34 define the surfaces on which a metallic seal is to be formed. The free end face of the adjusting strip 30 is rounded.

The hook strip of the first profile 25 is identified by the reference numeral 36; the hook projection molded to it has the reference numeral 37. In this example embodiment, the hook projection 37 has an additional undercut projection 38 for forming an undercut provided in the region of the side wall 29 of the anchoring channel 27.

On the hook strip 39 of the second profile 26, the hook projection 40 is equipped with an undercut projection 41 engaging in the undercut of the anchoring channel 27 formed by the undercut projection 38. A clamping strip 42 is molded to the rear side of the hook strip 39 or the hook projection 40, respectively, which clamping strip extends towards the side wall 28 and reaches between the prestressing bulge 32 and the tensioning projection 34.

For producing the profile assembly 24, the adjusting strip 30 is formed from its pre-tensioning position shown in FIG. 7 into its position shown in FIG. 8 by means of a roller as the forming tool and a respective abutment. This forming process moves the adjusting strip about the pivot point defined by the groove 31 towards the clamping strip 42. In this process, the prestressing bulge 32 is formed to provide a two-point prestressing support in interaction with the abutment provided by the tensioning projection 34, namely as a metallic seal between the two profiles 25, 26, which are also made of an aluminum alloy. As a result of the forming process of the adjusting strip 30, the free end face 35, which is initially rounded, is formed with respect to the outer side of the hook strip 39 and acts under prestress against this outer side, wherein the side of the undercut projection 38 facing the adjusting strip 30 acts as an abutment. Thus the adjusting strip 30 is secured by a locking bulge in the example embodiment as well. Thus metallic seals are formed in this profile assembly 24 at two positions which oppose one another.

At the same time, the profile assembly 24 is kept clearance-free in the direction of the profiles 25, 26 by pressing in the hook projection 40 between the adjusting strip 30 and the undercut projection 38. In this example embodiment as well, a length compensating zone follows the clamping zone of the hook projection 41 towards the second profile 26, as has been described for the example embodiment shown in FIGS. 1 to 6. The profile assembly 24 is also gastight and watertight.

The invention has been described with reference to exemplary embodiments. Without departing from the scope of the applicable claims, a person skilled in the art will see numerous other design options of implementing the invention, which do not have to be explained in detail herein.

LIST OF REFERENCE NUMERALS

| | |
|---|---|
| 1 | First profile |
| 2 | Second profile |
| 3 | Lower flange |
| 4 | Upper flange |
| 5 | Hook strip |
| 6 | Web |
| 7 | Anchoring channel |
| 8 | Hook strip |
| 9 | Adjusting strip |
| 10 | Profile assembly |
| 11 | Side wall |
| 12 | Side wall |
| 13 | Bottom |
| 14 | Hook projection |
| 15 | Hook projection |
| 16 | Groove |
| 17 | Hook receptacle |
| 18 | Free end face |
| 19 | Chamber |
| 20 | Locking bulge |
| 21 | Forming tool |
| 22, 22.1 | Block arrow |
| 23, 23.1 | Block arrow |
| 24 | Profile assembly |
| 25 | First profile |
| 26 | Second profile |
| 27 | Anchoring channel |
| 28 | Side surface |
| 29 | Side surface |
| 30 | Adjusting strip |
| 31 | Groove |
| 32 | Prestressing bulge |
| 33 | Bottom |
| 34 | Tensioning projection |
| 35 | Free end face |
| 36 | Hook strip |
| 37 | Hook projection |
| 38 | Undercut projection |
| 39 | Hook strip |
| 40 | Hook projection |
| 41 | Undercut projection |
| 42 | Clamping strip |

The invention claimed is:

1. A method for providing a profile assembly, the profile assembly comprising a first profile and a second profile connected on its long side to the first profile, which two profiles each have a hook strip integrally formed on their long side, wherein a hook projection of the hook strip of the first profile points in one direction and a hook projection of the hook strip of the second profile points in an opposite direction, the method comprising:

arranging the two profiles to bring the hook strips into engagement with one another in a claw-like manner, wherein the first profile has an anchoring channel following its longitudinal extension, the anchoring channel provided by the hook strip of the first profile and comprising a bottom, and the hook strip of the second profile has a clamping strip integrally formed thereon, and joining the two profiles via a cold joining process using a cold forming tool to produce the profile assembly, whereby the hook strip of the second profile is secured by its hook projection and its clamping strip in the anchoring channel of the first profile by a cold joining connection, and wherein, in order to produce the cold joining connection, one of the two hook strips comprises an adjusting strip which is adjusted in the cold joining process and which is supported in the produced profile assembly by a free end face of the adjusting strip under prestress, whereby the hook strip of the second profile secured in the anchoring channel of the first profile is placed under prestress within the anchoring channel at two points situated opposite one another in a direction of the height of the profile assembly, with respect to adjoining portions of the first profile as a result of the cold joining connection, whereby an outer surface of the adjusting strip introduces pressure into the bottom of the anchoring channel due to the cold forming tool acting on a backside of the adjusting strip during the cold joining process, and as a result, the pressure is introduced via the bottom of the anchoring channel into material of the second profile within the anchoring channel such that the hook projection of the hook strip of the second profile is brought into abutment under prestress with the hook projection of the hook strip of the first profile.

2. The method of claim 1, wherein the adjusting strip is molded to the hook strip of the second profile on an opposite side with respect to the hook projection of the hook strip of the second profile and forms the clamping strip in the produced profile assembly, and wherein, before the joining step, a distance between the side walls of the anchoring channel against which the hook strip of the second profile is prestressed is smaller than a distance of the free end face of the adjusting strip across the outer side of the hook strip to the point of the hook projection of the second profile which is situated opposite the free end face of the adjusting strip in the produced profile assembly.

3. The method of claim 2, wherein a supporting surface of the hook projection of the second profile inserted into the anchoring channel has a convex curvature forming a vertex, which supporting surface acts against a side wall of the anchoring channel in the produced profile assembly.

4. The method of claim 3, wherein the side wall of the anchoring channel on which the hook projection of the second profile is supported is either not curved or curved at a greater radius than the supporting surface of the hook projection supported thereon.

5. The method of claim 2, wherein a side wall of the anchoring channel on which the adjusting strip of the hook strip of the second profile is supported is inclined at least at in an end section adjacent the bottom of the anchoring channel.

6. The method of claim 2, wherein the hook strip carrying the adjusting strip has a tapering in a region where the adjusting strip is connected to the hook strip.

7. The method of claim 6, wherein the tapering is provided by a groove on the outer side of the hook strip in the region where the adjusting strip is connected to the hook strip and follows the longitudinal extension of the hook strip.

8. The method of claim 1, wherein a bulge of material locking the free end of the adjusting strip is formed by the cold joining process.

9. The method of claim 8, wherein the cold forming tool forms the bulge of material which locks the free end of the adjusting strip after being pressed into the anchoring channel.

10. The method of claim 1, wherein the first and second profiles are hollow chamber profiles and each comprise an upper flange and a lower flange, and wherein the first and second profiles are connected to each other at their upper flanges and lower flanges by said profile assemblies produced with the method.

11. The method of claim 1, wherein the first and second profiles are extruded profiles.

12. The method of claim 11, wherein the first and second profiles are made of a metal alloy.

\* \* \* \* \*